United States Patent Office 2,813,058
Patented Nov. 12, 1957

2,813,058
RODENTICIDE AND METHOD OF MAKING SAME

Benjamin D. Smith, Utica, N. Y.

No Drawing. Application October 1, 1956,
Serial No. 612,943

6 Claims. (Cl. 167—46)

This invention relates to rodenticides and a method of making rodenticides for destroying vermin. More particularly this invention concerns rodenticides of the granular type that are generally toxic to rodents and relatively non-toxic and easily counteracted when ingested by humans and farm or domestic animals. This application is a continuation-in-part of applications Serial Nos. 393,993, filed November 24, 1953, and 410,423, filed February 15, 1954, and now abandoned.

Every year many millions of dollars' worth of grains and other foodstuff are damaged or destroyed by rats, mice and other rodents. Man is continually waging what sometimes appears to be a losing battle against such losses. For many years much research has been conducted relative to improved compounds for rodenticides both as to composition, size, and shape best suited to the purpose of destroying vermin. Heretofore rodent baits have generally comprised a toxic poison powder or liquid that was sprinkled over the grain, bread and similar food that rodents attack. Other forms have included the large balls or "knots" as they are sometimes called of powdered poison containing compounds which the rodents could gnaw open and eat the poisoned food. None of these forms were particularly attractive to the rodents and in many instances they soon developed a so-called "bait shyness" to the various compounds used. The rat is a very smart and clever creature and when it sees one of its brethren dying in agony very shortly after eating poisoned food he avoids the source of that poison from then on.

Recently it has been found that compounds such as 3 - (α - acetonylbenzyl) - 4 - hydroxycoumarin, sold under the trade name, "Warfarin," and similar anticoagulant, multiple dose compounds are particularly suited for use in rodenticides. These compounds work over a period of time and do not produce violent deaths in the rats so that there is less chance of developing "bait shyness" with this as the rodent killing agent.

According to the present invention I have discovered that a rodent bait containing an anticoagulant type rodenticide made into a pellet of approximately one-quarter inch diameter and three-eighths to three-quarters inch length provides an ideal solution to the rodent problem and results in early and substantially complete elimination of rodent infestations. Furthermore I have discovered a method of making pellets utilizing "Warfarin" in its so-called water insoluble form.

Accordingly it is an object of the present invention to provide a rodent bait that is particularly attractive to rodents. It is another object of the present invention to provide a bait that is easily placed in rodent runways and other places without special dispensers and the like. It is a further object to provide a bait in a clean, easily handled and safe form. It is a further object to provide an improved ready-to-use bait that is safe and easy to use and economical to manufacture. It is a further object of the present invention to provide a method of extruding pellets containing "Warfarin" without the use of water or steam. It is another object of the present invention to provide a method of making pellet form rodenticides containing a vermin killing agent adversely affected by water. It is a still further object of the present invention to provide a method of forming rodenticide pellets that will withstand packing and shipping without excessive crumbling and which contain a killing agent of the type that forms a hard solid mass in the presence of water. These and other and further objects will be in part apparent and in part pointed out as the specification proceeds.

In a preferred form of my invention the bait comprises generally a cylindrical pellet of approximately one-quarter inch diameter and from three-eighths of an inch to three-quarters of an inch long. These dimensions are average and may vary slightly from pellet to pellet but should be taken as essentially minimum dimension. The cylindrical surface walls of the pellet are generally of a hard, impervious nature with a smooth surface formed by the extrusion process as will be described herein. The ends of the pellets are generally of a somewhat rougher texture and are quite porous. These features, it has been found, form a very desirable configuration for the rodents to chew on and present a tough nut-like characteristic which satisfies the rodent's natural desire to gnaw. In addition this hard outer surface and the porous ends assist in giving the bait a long shelf life and good carrying characteristics— the porous ends permitting the pellets to breathe somewhat and maintain the desired moisture content so they do not harden excessively and the hard outer surface gives a form to the pellets so they do not crumble into powder on transportation thereof.

The pellet according to the present invention is advantageously made of a mixture of a ground cereal, such as corn, oats and the like to which is added a little sugar, sometimes in the form of a few drops of corn syrup, molasses or the like; small quantities of powdered cheese, peanut meal, etc., and the rodent-killing agent such as "Warfarin."

In a preferred form of my present invention to make a four hundred pound batch I first place fifty pounds of ground oats in a mixer. Secondly I add twenty pounds of a "Warfarin" mixture containing .5 precent "Warfarin" with a carrier of cornstarch or the like. Next I add twenty-five pounds of pulverized or powdered sugar sold commercially as XXXXXX Sugar and two and one half pounds of a medium sharp powdered cheese, and two and a half pounds of peanut meal. Finally I add three hundred pounds of corn meal and mix the whole mass thoroughly for fifteen to twenty minutes.

After this mixing the ingredients are fed to an extruding machine and the mix is extruded through circular dies approximately one-quarter inch in diameter under very high pressure to tightly compact the mix into solid, impervious rods that, after a short driving period, are substantially dry and hard. A rotary knife or other suitable means is then utilized to cut the rods to the desired length producing pellets of the above described dimensions.

The pellets, as they come from the extruder are slightly warm, soft, and moist. A small amount of moisture is present in the corn meal and cheese but not sufficient to adversely affect a water non-soluble type Warfarin mix. The pellets are allowed to cool and dry for a short period which results in the formation of a hard, solid non-friable pellet as described above. It would appear in this method that the cheese acts as a lubricant during the extrusion and an attractant or lure in the bait, and that the sugar acts as a binder to hold the other ingredients together in pellet form and to prevent excessive crumbling in the packages. The mixture generally though is too crumbly to be properly tableted in the so-called tablet machines.

The pellets are then ready for packaging and shipping and it has been found that this configuration and treatment causes them to be extremely durable in shipment and to have a long shelf life. The thorough mixing of the "Warfarin" in the bait prevents the rodents from brushing it aside or readily detecting it so that the rodents as easily induced into eating the bait with the expected fatal results.

In addition, the size and composition described permits the rodents, such as rats, to easily pick up the pellets between their teeth and to gnaw on them as their natural instincts dictate. Also they may carry them off to their nest or other protected place where they can chew them and crush them at their leisure. This is a very important feature since rats are naturally wary and must of necessity eat food that permits them to gnaw and chew and keep their teeth worn down, otherwise their teeth will grow to the point where they cannot get food into their mouths and the rats will starve to death.

Furthermore this form of bait results in a greater efficiency in the use of the bait. It has been clearly established that in a highly infested area rats will fight among themselves for food so that a supply of bait placed in a rodent runway will very quickly be scattered and a large portion of it lost. However, with applicant's form of bait, the pelletls, even though scattered, can be picked up individually by the rodents so that 100 percent of the bait is utilized. For this reason the pellets can be deliberately scattered along rodent runways, in holes, etc., where the rodents can pick up the individual pellets without exposing themselves to any form of danger thus greatly increasing the effectiveness and efficiency of the rodent bait.

Finally this form of bait eliminates the necessity for the use of any special containers or dispensers to hold the bait in an attractive and useful condition.

In actual tests performed on the present bait it was found that the rodent greatly preferred the bait according to the present invention over other types of baits including powders, powdered baits, seed-like baits, small grain type baits and other smaller pellet type baits. In test after test the pellets made according to the present invention were greatly preferred over other types of smaller baits or powders to the point where in many cases the bait according to the present invention was eaten exclusively. In one particular test some two hundred pellets made according to the present invention were placed in a rat infested area alongside a teaspoonful of small pellets approximately three-sixteenths inch in diameter and one-quarter inch in length. In each case the pellets were made of the identical formula as set forth infra and after about twenty-four hours' exposure all two hundred pellets of the present invention were eaten and none of the smaller pellets was touched.

While there is given above a certain specifice example of this invention and its application in practical use, it should be understood that this is not intended to be exhaustive or to be limiting of the invention. On the contrary, this illustration and explanation herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. A rodenticide of the multiple dosage type comprising a plurality of discrete pellets, said pellets consisting of lengths of from three-eighths to three-quarters inch cut from a continuous length of rodent attractant and rodent poison mixed into a homogeneous plastic mass and extruded under high pressure to form a tightly compacted, dry, hard, elongated member of approximately one-quarter inch cross-sectional dimension and having a smooth, impervious outer surface, the ends of the pellets so formed being relatively porous.

2. A rat bait of the selective, multiple dose type adapted for easy use without special applicators and the like comprising a plurality of discrete pellets of a mixture of rodent attractant and rodent poison; each of said pellets being extruded into a hard, non-friable substantially cylindrical shape having a smooth, impervious outer side surface and relatively porous end surfaces; said pellets beings approximately one-quarter inch in diameter and between three-eighths and three-quarters of an inch in length; whereby a bait is obtained that can be individually picked up by rats and readily chewed.

3. A rodent bait of the self contained type adapted to be placed in the rodent runways and the like without special applicators which comprises a plurality of discrete cylindrical particles of rodent food material and a rodent poison uniformly distributed therethrough; each of said particles being compacted into a hard mass and having a length of approximately three-quarters of an inch and a diameter of one-quarter to three-eighths of an inch whereby a highly attractive bait is provided in a form which can be easily chewed and gnawed by rodents in a natural manner.

4. The method of making a rodenticide of the type having therein a vermin killing agent rendered unworkable by the presence of excessive moisture which comprises mixing a quantity of grain products together with a quantity of said vermin killing agent; adding a quantity of powdered cheese as a lubricant and vermin lure; adding a quantity of pulverized sugar as a binder; extruding the resultant mix through dies having a diameter of approximately one-quarter inch, and cutting the resultant extruded rod into lengths of from one-half to three-quarters of an inch; and cooling and drying said pellets to produce a hard, non-friable rodenticide.

5. The method of making rodenticide pellets containing 3 - ($\alpha$ - acetonylbenzyl) - 4 - hydroxycoumarin which comprises mixing together eighty-six parts of cereal products, five parts of 3-($\alpha$-acetonylbenzyl)-4-hydroxycoumarin, three parts of peanut meal, and six parts of finely powdered sugar, extruding said mix through dies having a diameter of approximately one-quarter inch under pressure to form substantially solid elongated bars of said mixture, cutting said bars into pellets having a length of approximately one-half inch, and cooling said pellets to a hard, non-friable form.

6. The method of making a rodenticide in pellet form with a vermin killing agent rendered unworkable by the presence of excessive moisture which comprises mixing a quantity of substantially dry grain products, a quantity of said vermin killing agent, a quantity of substantially water-free lubricant, and a quantity of substantially waterless binder material into a smooth homogeneous mix; and extruding said mix, under pressure into hard, solid, non-friable pellets said pellets being approximately one-quarter inch in diameter and from one-half to three-quarters of an inch in length.

References Cited in the file of this patent

UNITED STATES PATENTS

| 222,413 | Lyons | Dec. 9, 1879 |
| 944,419 | Ellis | Dec. 28, 1909 |
| 2,432,326 | Meakin | Dec. 9, 1947 |
| 2,523,252 | Smith | Sept. 19, 1950 |
| 2,554,756 | Smith | May 29, 1951 |

FOREIGN PATENTS

| 574,282 | Great Britain | Dec. 31, 1945 |

OTHER REFERENCES

Dykstra: Pest Control, July 1952, pp. 12, 14, 46 and 48.

Manufacture of Compressed Tablets, by Silver and Clarkson, pub. 1944, by F. J. Stokes Machine Co., pp. 4, 5, 20, 21 and 30-34.